Patented May 28, 1929.

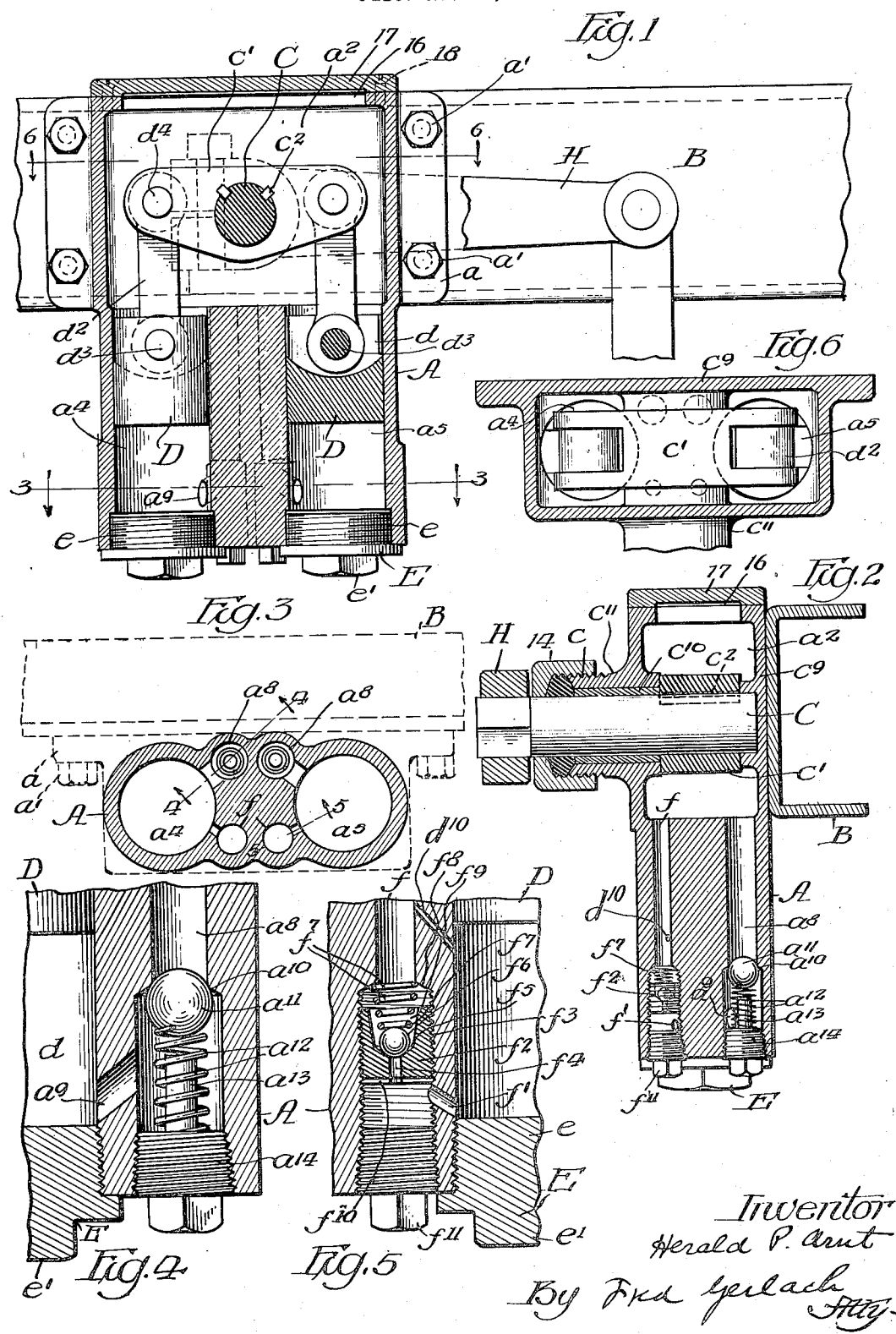
May 28, 1929. H. P. ARNT 1,715,113
SHOCK ABSORBER
Filed Nov. 5, 1926
Inventor
Herald P. Arnt
By Fred Gerlach Atty.

1,715,113

UNITED STATES PATENT OFFICE.

HERALD P. ARNT, OF JACKSON, MICHIGAN.

SHOCK ABSORBER.

Application filed November 5, 1926. Serial No. 146,327.

The invention relates to hydraulic shock absorbers for vehicles.

The objects of the invention are: to provide a shock absorber of this type which comprises a pair of cylinders in a unitary casing, having their axes disposed in side by side relation and substantially parallel, and of a construction which can be manufactured at a low cost; in which provision is made for varying the retarded flow of the liquid in cushioning, to adapt it for vehicles of different weights, according to the action of the vehicle springs; which is universally applicable to the right and left side or front and rear portions of the vehicle; and in which the liquid-ports are all formed so they can be readily drilled in the casing.

The invention consists in the several novel features hereinafter set forth and more particularly defined by claims at the conclusion hereof.

In the drawing: Fig. 1 is a vertical longitudinal section of a shock absorber embodying the invention. Fig. 2 is a central transverse section. Fig. 3 is a section on line 3—3 of Fig. 1. Fig. 4 is a section upon a somewhat larger scale of one of the intake valves. Fig. 5 is a similar view of one of the outlet valves. Fig. 6 is a horizontal section on line 6—6 of Fig. 1.

The invention is exemplified in a shock absorber comprising a casing A which is provided with integral lugs $a$, so that it may be secured by bolts $a'$ to a support, such as the sill B of a vehicle frame. The casing has formed in its upper portion a chamber $a^2$ for a rocker lever $c'$ which is keyed to a transverse shaft C which is journalled in the casing. An arm H is connected to the outer end of the shaft C and the distal end of this arm is connected in any suitable manner to the vehicle axle or some part secured thereto, so that relative movement between the axle and the vehicle-frame or body will oscillate the arm H to rock shaft C so as to operate the lever $c'$ responsively to the up and down movements of the vehicle frame permitted by the usual leaf-springs interposed between the axle and the frame. The inner end of shaft C is journalled in a closed bearing $c^9$ which is integrally formed with the back wall of the casing and in a bearing-sleeve $c^{10}$ in the front wall of the casing. A packing box 14 is provided at the front wall of the casing to prevent leakage around the shaft. Sleeve $c^{10}$ is driven into the boss $c^{11}$ which is integrally formed with the front wall of the casing to permit the shaft, with the keys $c^2$ thereon to be inserted into chamber $a^2$ from the front side of the casing. Cylinders $a^4$ and $a^5$ extend downwardly from the end portions of the chamber $a^2$ and are integrally formed therewith. These cylinders are separated from one another, extend vertically downward in side-by-side relation from the chamber $a^2$, and extend to the lower end of the casing A. Pistons D are slidably mounted in the cylinders respectively. The upper end of each piston is bifurcated, as at $d$, and is connected to one end of the rocker lever $c'$ by a pitman $d^2$. The lower end of each pitman or link $d^2$ is pivotally connected to a piston by a pin $d^3$ and its upper end is confined in one of the bifurcated ends of the lever $c'$ and pivoted thereto by a pin $d^4$. Rotative movement of the shaft C in either direction will rock the lever $c'$ and simultaneously import opposite reciprocatory movement to the pistons D through the links $d^2$. The chamber $a^2$ and the cylinders, the upper ends of which are in communication therewith, are filled with a suitable liquid, such as oil, substantially to the top of the casing. To permit the pistons, lever $c'$ and the pitmen $d^2$ to be inserted into the casing after they have been assembled, the top of the casing has an opening 16 which is closed by a cover-plate 17 which is removably secured to the casing by screws 18. The lower or outer ends of the cylinders are each closed by a head or plug E which is screw-threaded, as at $e$, to the lower end of one of the cylinders and is provided with a polygonal portion $e'$ whereby it may be turned into and out of the cylinder.

The liquid is adapted to be simultaneously drawn into the lower end of one cylinder and to be compressed in the lower end of the other cylinder when the pistons are operated responsively to relative movement between the axle and the vehicle frame. To control the flow of liquid from chamber $a^2$ into the cylinders respectively during the alternating up-strokes of the pistons, a pair of vertical ducts $a^8$ have their lower ends connected to receive liquid from one of the cylinders by an inclined duct $a^9$. To prevent backflow of the liquid through the ducts $a^9$ during the compression strokes of the pistons respectively, each duct $a^8$ is formed with a valve-seat $a^{10}$ for a ball-valve $a^{11}$ which is normally held closed by a coil-spring $a^{12}$ which is held on the stem $a^{13}$ which extends inwardly from a screw plug $a^{14}$ which closes the lower end of duct $a^8$. A characteristic of this construction is that the ducts $a^8$ and valve seat, before the plugs are inserted, may be conveniently drilled into the casing, and ducts $a^9$ are inclined so that when the plugs E are removed, they may be formed by drills inserted obliquely through the lower ends of the cylinders.

The fluid compressed by the pistons in the outer ends of the cylinders respectively, passes back to the chamber $a^2$ through ducts $f$ which communicate with the lower ends of the cylinders respectively by means of oblique ducts $f'$. The upper ends of the ducts $f$ are open to the chamber $a^2$. A plug $f^2$ is screw-threaded, as at $f^3$, to an enlarged lower end of each duct $f$. These plugs are disposed above the ports $f'$ and a small duct $f^4$ leads from the lower end of each plug to a seat $f^5$ for a ball-valve $f^6$ which is normally pressed against said seat by a spring $f^7$. The upper end of each spring $f^7$ bears against the shoulder $f^8$ formed in the duct $f$, and its lower end is confined in the socket $f^9$ in the plug $f^2$. Port $f^4$ permits the compressed fluid in the lower ends of the cylinder to exert sufficient pressure against the ball valve $f^6$ to unseat it to permit the fluid to slowly escape from the cylinders to the chamber $a^2$ during the compression strokes of the pistons respectively. A characteristic of this construction is that the pressure of the spring $f^7$ may be regulated to a nicety by turning the plug $f^2$ in the threaded lower portion of the duct $f$. The outer end of the plug is provided with a kerf $f^{10}$ so that it may be turned by a screw-driver inserted from the outer end of the duct $f$ when the plug $f^{11}$, which closes the lower end of the duct, has been removed.

In order to prevent the resistance of the fluid from being too abruptly applied while the vehicle frame is being subjected to minor shocks and the arm H is near its normal position, oblique leak ports $d^{10}$ lead from the cylinders to the ducts $f$ above the valves $f^6$ respectively. As a result, during the initial portions of the compression strokes of the pistons, a small portion of the liquid may leak directly from the cylinders into one of the ducts $f$ until the pistons have been moved sufficiently to close the ports, which occurs when the vehicle is subjected to substantial shocks. The inlet ducts, through which the liquid flows from chamber $a^2$, are considerably larger in diameter than the ports $f^4$ which limits the escape of the compressed fluid from the pistons. By providing inlets which do not substantially retard the upward movement of the pistons, it is possible to more accurately regulate the retardance of the compressed liquid by the valve $f^6$.

In assembling the device, the pistons, lever and links are first assembled and then inserted into the casing through the opening 16 in the top thereof. Shaft C is then inserted transversely into the casing through bearing $a^{10}$, the key or keys on the shaft passing into corresponding grooves in the hub of the lever. Sleeves $c^{10}$ is then driven into the boss $a^{11}$ to close the bearing to form the outer bearing for the shaft. Ball-valves $a^{10}$ are inserted in the ducts $a^8$, and plugs $a^{14}$ are screwed into the ends of the ducts to hold the springs $a^{12}$ and to close the lower ends of said ducts. Plugs $f^2$, with the ball-valves $f^6$ and their springs therein, are then screwed into the threaded portions $f^3$ of the ducts $f$. The plugs $f^2$ will be positioned to regulate the fluid pressure required to open the outlet valves $f$, according to the load imposed upon, and action of, the springs of the vehicle. Plugs $f^{11}$ will then be screwed into the lower end of the portion $f^3$ to close the ducts $f$.

The operation will be as follows: Normally, the pistons will be disposed approximately in the position shown in Fig. 1. When the vehicle is subjected to a shock which will cause the vehicle body or frame to move toward the axle, arm H will rock shaft C and the lever $c'$ to operate one of the links $a^2$ to lift or retract one of the pistons D and the other link to lower or move outwardly the other piston D. The upwardly moving piston will draw liquid freely into its cylinder through the inlet duct $a^8$, past valve $a^{11}$ and through port $a^9$. The downwardly moving piston D will compress the liquid in its cylinder and close the valve $a^{11}$ in its intake port. Initially, a little of the liquid will leak through the cylinder through the leak port $d^{10}$ and as the downward movement of said piston continues, it will close the leap port and further compress the liquid until it exerts sufficient force against the ball-valve $f^6$ to overcome the force of its spring $f^7$, whereupon a restricted quantity of the liquid will be permitted to escape through said duct $f^4$ to cushion the movement of the piston D and the lever H. During the reverse movement of the arm H, the movements and action of the pistons will be reversed so that the reverse movement of the arm H will be similarly cushioned.

The construction described exemplifies one in which oppositely moving pistons are connected so as to move positively with a rocker arm in the chamber containing the liquid; in which the cylinders are vertically arranged in side-by-side relation and have their axes parallel; in which the intake and outlet ducts for the liquid extend from the lower end of the casing longitudinally thereof to the liquid chamber around the lever; in which the valves are readily accessible; in which the operation of the valves for the discharge ducts may be regulated according to different loads; and which is simple in construction and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a shock absorber for vehicles, the combination of a casing, provided with a pair of cylinders disposed in side-by-side relation and having their axes substantially parallel, a chamber over and between the inner ends of and open to the cylinders containing liquid, a transverse shaft journalled in the casing, connected for rotation by the relative movements between the vehicle body and an axle, and extending into said chamber, a lever fixedly secured to the shaft, in said chamber, pistons slidably mounted in the cylinders and connected to be shifted in opposite directions by said lever, inlet ducts for liquid extending longitudinally of the casing and leading from the chamber to the cylinders respectively, check-valves in said inlet ducts, and restricted outflow ducts for permitting the liquid to pass from the cylinders into the chamber.

2. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing connected for rotation by the relative movements between the vehicle body and an axle, and extending into said chamber, a lever fixedly secured to the shaft, in said chamber, pistons slidably mounted in the cylinders and connected to be shifted in opposite directions by said lever, intakes comprising ducts for liquid extending longitudinally of the casing and leading from the chamber through the lower end of the casing, and ports leading to the cylinders respectively, check-valves in said intake ducts, and restricted flow ducts for permitting the liquid to pass from the cylinders into the chamber.

3. In a shock absorber for vehicles, the combination of a casing provided with a pair of cylinders disposed in side-by-side relation and having their axes substantially parallel, a chamber over and between the inner ends of and open to the cylinders containing liquid, a transverse shaft journalled in the casing, connected for rotation by the relative movements between the vehicle body and an axle, and extending into said chamber, a lever fixedly secured to the shaft, in said chamber, pistons slidably mounted in the cylinders and connected to be shifted in opposite directions by said lever, inlet ducts for liquid extending longitudinally of the casing and leading from the chamber to the cylinders respectively, check-valves in said inlet ducts, and outflow ducts extending longitudinally of the casing and downwardly from the chamber and connected to the cylinders respectively.

4. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing, connected for rotation by the relative movements between the vehicle body and an axle, and extending into said chamber, a lever fixedly secured to the shaft in said chamber, pistons slidably mounted in the cylinders and connected to be shifted in opposite directions by said lever, intakes comprising ducts for liquid extending longitudinally downward from the chamber to the lower end of the casing, and ports between the ducts and the cylinders respectively, check-valves in said inlet-ducts, removable plugs closing the lower ends of the intake ducts, and restricted outflow ducts for permitting the liquid to pass from the cylinders into the chamber.

5. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing, connected for rotation by the relative movements between the vehicle body and an axle, and extending into said chamber, a lever fixedly secured to the shaft in said chamber, pistons slidably mounted in the cylinders and connected to be shifted in opposite directions by said lever, intakes comprising ducts for liquid extending longitudinally downward from the chamber to the lower end of the casing, and ports between the ducts and the cylinders respectively, check-valves in said inlet-ducts, removable plugs closing the lower ends of the intake ducts, restricted outflow ducts extending longitudinally between the chamber and the lower end of the casing, and connected to the cylinders respectively, and removable plugs closing the lower ends of the outflow ducts.

6. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing, connected for rotation by the relative movements between the vehicle body and an axle, and extending into said chamber, a lever fixedly secured to the shaft in said chamber, pistons slidably mounted in the cylinders and connected to be shifted in opposite directions by said lever, intakes comprising ducts for liquid extending longitudinally downward from the chamber to the lower end of the casing, and oblique ports between the ducts and the cylinders respectively, check-valves in said inlet-ducts, removable plugs closing the lower ends of the intake ducts, and restricted outflow ducts for permitting the liquid to pass from the cylinders into the chamber.

7. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing connected for rotation by the relative movements between the vehicle body and an axle, and extending into said chamber, a lever fixedly secured to the shaft in said chamber, pistons slidably mounted in the cylinders, links pivotally connected to the lever and the pistons to positively shift them in opposite directions, inlet ducts for liquid extending longitudinally downward from the chamber and connected to the cylinders respectively, check-valves in said inlet ducts, longitudinal outflow ducts also extending downwardly from the chamber and connected to the cylinders respectively, for permitting the liquid to pass from the cylinders into the chamber, and spring-closed valves in said outflow ducts.

8. In a shock absorber for vehicles, the combination of a casing provided with a pair of cylinders disposed in side-by-side relation and having their axes substantially parallel, a chamber over and between the upper ends of and open to the cylinders, containing liquid, a transverse shaft journalled in the casing connected for rotation by the relative movements between the vehicle-body and an axle, and extending into said chamber, a lever fixedly secured to the shaft in said chamber, pistons slidably mounted in the cylinders and connected to be positively shifted in opposite directions by said lever, inlet ducts for liquid extending longitudinally of the casing and leading from the chamber to the cylinders respectively, check-valves in said inlet ducts, outlet ducts extending longitudinally from the chamber to the lower ends of the casing, valves in the outlet ducts for restricting the flow of liquid back to the chamber and removable plugs for closing the lower ends of the outflow ducts respectively.

9. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing connected for rotation by the relative movements between the vehicle-body and an axle, and extending into said chamber, a lever fixedly secured to the shaft in said chamber, pistons slidably mounted in the cylinders and connected to be positively shifted in opposite directions by said lever, inlet ducts for liquid extending longitudinally of the casing and leading from the chamber to the cylinders respectively, check-valves in said inlet ducts, outlet ducts extending longitudinally from the chamber to the lower ends of the casing, adjustable plugs in said outlet ducts, spring-closed valves in said plugs, and removable plugs for closing the lower ends of the outlet ducts.

10. In a shock absorber for vehicles, the combination of a casing provided with a pair of cylinders disposed in side-by-side relation and having their axes substantially parallel, a chamber over and between the inner ends of and open to the cylinders containing liquid, a transverse shaft journalled in the casing, connected for rotation by the relative movements between the vehicle body and an axle, and extending into said chamber, a lever fixedly secured to the shaft, in said chamber, pistons slidably mounted in the cylinders and connected to be shifted in opposite directions by said lever, inlet ducts for liquid extending longitudinally of the casing and leading from the chamber to the cylinders respectively, check-valves in said inlet ducts, leak-ports for initially permitting liquid to escape from the cylinders and thereafter closed by the pistons, and restricted outflow ducts for permitting the liquid to pass from the cylinders into the chamber.

11. In a shock absorber for vehicles, the combination of a casing provided with a pair of cylinders disposed in side-by-side relation and having their axes substantially parallel, a chamber over and between the upper ends of and open to the cylinders containing liquid, a transverse shaft journalled in the casing connected for rotation by the relative movements between the vehicle-body and an axle, and extending into said chamber, a lever fixedly secured to the shaft in said chamber, pistons slidably mounted in the cylinders and connected to be positively shifted in opposite directions by said lever, inlet ducts for liquid extending longitudinally of the casing and leading from the chamber to the cylinders respectively, check-valves in said inlet ducts, outlet ducts extending longitudinally from the chamber to the lower ends of the casing, leak-ports for initially permitting liquid to escape from the cylinders and thereafter closed by the pistons, valves in the outlet ducts for restricting the flow of liquid back to the chamber and removable plugs for closing the lower ends of the outflow ducts respectively.

12. In a shock absorber for vehicles, the combination of a casing, a pair of cylinders disposed in side-by-side relation and having their axes substantially parallel and integrally formed with and extending to the lower end of the casing, a chamber over and between the upper ends of and open to the cylinders containing liquid, a transverse shaft journalled in the casing connected for rotation by the relative movements between the vehicle-body and an axle, and extending into said chamber, a lever fixedly secured to the shaft in said chamber, pistons slidably mounted in the cylinders and connected to be positively shifted in opposite directions by said lever, inlet ducts for liquid extending longitudinally of the casing and leading from the chamber to the cylinders respectively, check-valves in said inlet ducts, outlet ducts extending longitudinally from the chamber to the lower ends of the casing, valves in the outlet ducts for restricting the flow of liquid back to the chamber, and removable plugs for closing the lower ends of the cylinders respectively.

13. In a shock absorber for vehicles, the combination of a casing, a pair of cylinders disposed in side-by-side relation and having their axes substantially parallel and integrally formed with and extending to the lower end of the casing, a chamber over and between the upper ends of and open to the cylinders containing liquid, a transverse shaft journalled in the casing connected for rotation by the relative movements between the vehicle-body and an axle, and extending into said chamber, a lever fixedly secured to the shaft in said chamber, pistons slidably mounted in the cylinders and connected to be positively shifted in opposite directions by said lever, inlet ducts for liquid extending longitudinally of the casing and leading from the chamber to the cylinders respectively, check-valves in said inlet ducts, outlet ducts extending longitudinally from the chamber to the lower ends of the casing, valves in the outlet ducts for restricting the flow of liquid back to the chamber, and removable plugs for closing the lower ends of the cylinders and said longitudinal ducts respectively.

14. In a shock absorber for vehicles, the combination of a casing, a pair of cylinders disposed in side-by-side relation and having their axes substantially parallel and integrally formed with and extending to the lower end of the casing, a chamber over and between the upper ends of and open to the cylinders containing liquid, a transverse shaft journalled in the casing connected for rotation by the relative movements between the vehicle-body and an axle, and extending into said chamber, a lever fixedly secured to the shaft in said chamber, pistons slidably mounted in the cylinders and connected to be positively shifted in opposite directions by said lever, inlet ducts for liquid extending longitudinally of the casing and leading from the chamber to the cylinders respectively, check-valves in said inlet ducts, outlet ducts extending longitudinally from the chamber to the lower ends of the casing, adjustable plugs in the outlet ducts, spring-closed valves in said adjustable plugs, and removable plugs for closing the lower ends of the cylinders and the outlet ducts.

Signed at Chicago, Illinois, this 15th day of October, 1926.

HERALD P. ARNT.